United States Patent [19]

Neubauer

[11] Patent Number: 4,692,989
[45] Date of Patent: Sep. 15, 1987

[54] PROCESS AND APPARATUS FOR PROFILING ROD-LIKE WORKPIECES

[75] Inventor: Walter Neubauer, Ohlsdorf, Austria

[73] Assignee: Linsinger Maschinenbau Gesellschaft mbH, Steyremühl, Austria

[21] Appl. No.: 881,115

[22] Filed: Jul. 1, 1986

[30] Foreign Application Priority Data

Jul. 5, 1985 [DE] Fed. Rep. of Germany ....... 3524123

[51] Int. Cl.$^4$ .......................... B23P 13/00; B23C 3/04
[52] U.S. Cl. ....................................... 29/558; 409/66; 409/72; 409/132
[58] Field of Search .................. 409/66, 67, 76, 77, 409/69, 70, 71, 131, 132; 29/557, 558, 156.8 B, 156.8 P

[56] References Cited

U.S. PATENT DOCUMENTS

| | | | |
|---|---|---|---|
| 2,410,261 | 10/1946 | Bradner | 409/66 |
| 3,457,954 | 7/1969 | Nyberg | 29/558 |
| 3,742,815 | 7/1973 | Sukhov et al. | 409/132 |
| 4,016,801 | 4/1977 | Ditson | 409/76 X |
| 4,034,646 | 7/1977 | Dahlin | 409/76 |
| 4,606,684 | 8/1986 | Shatwrov et al. | 409/132 |

FOREIGN PATENT DOCUMENTS

| | | | |
|---|---|---|---|
| 147755 | 4/1981 | Fed. Rep. of Germany | 409/132 |
| 157415 | 12/1980 | Japan | 409/132 |
| 62413 | 4/1985 | Japan | 409/76 |
| 1594965 | 8/1981 | United Kingdom | 409/66 |
| 707702 | 1/1980 | U.S.S.R. | 409/66 |
| 757302 | 5/1980 | U.S.S.R. | 409/131 |
| 1042906 | 9/1983 | U.S.S.R. | 409/132 |

Primary Examiner—William R. Briggs
Attorney, Agent, or Firm—Browdy and Neimark

[57] ABSTRACT

A milling process to produce profiles on rod-like workpieces at a high rate of cutting. The profiles are produced in cutting segments.

An apparatus is provided wherein the cutting edges are mounted on a milling head. The milling head rotates about its own axis and performs a relative circulating movement about the axis of the workpiece as well as a relative linear feed movement. The rotational and circulating movements are coordinated with one another in such a way that in accordance with their different radial positions and different cutting edge shapes the individual cutting edges form the profile on segmental portions of the contour while successively moving into the profile plane of the workpiece.

15 Claims, 4 Drawing Figures

Fig. 1
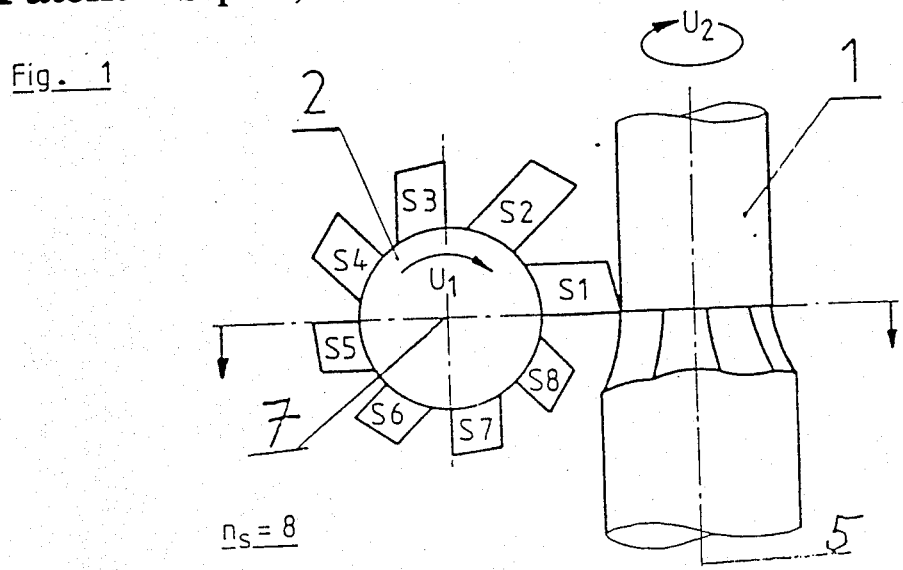
$n_s = 8$
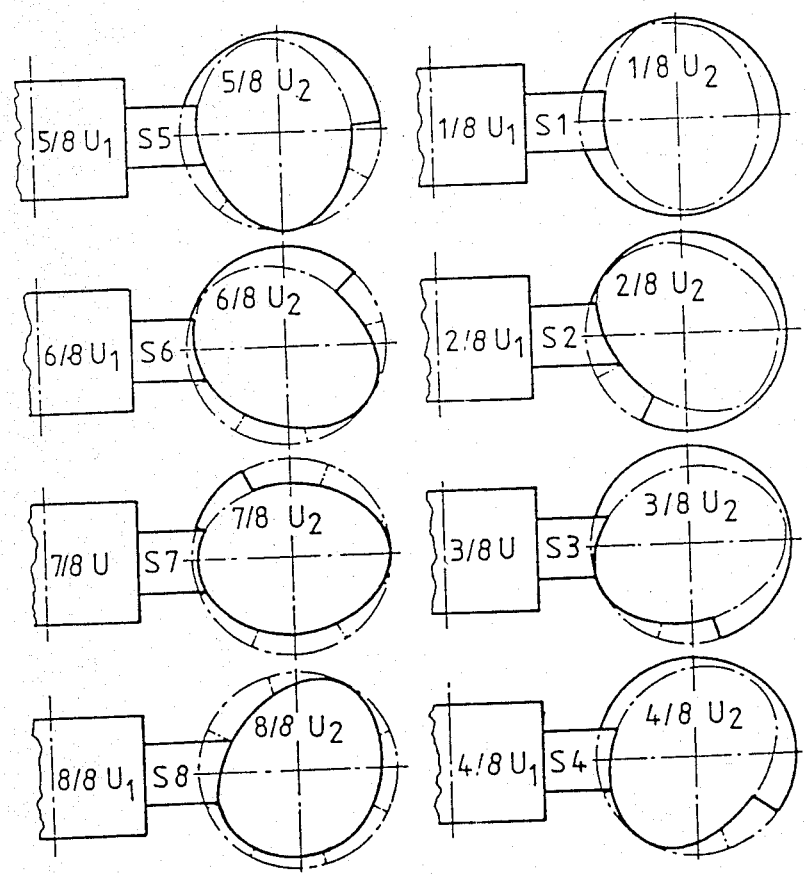

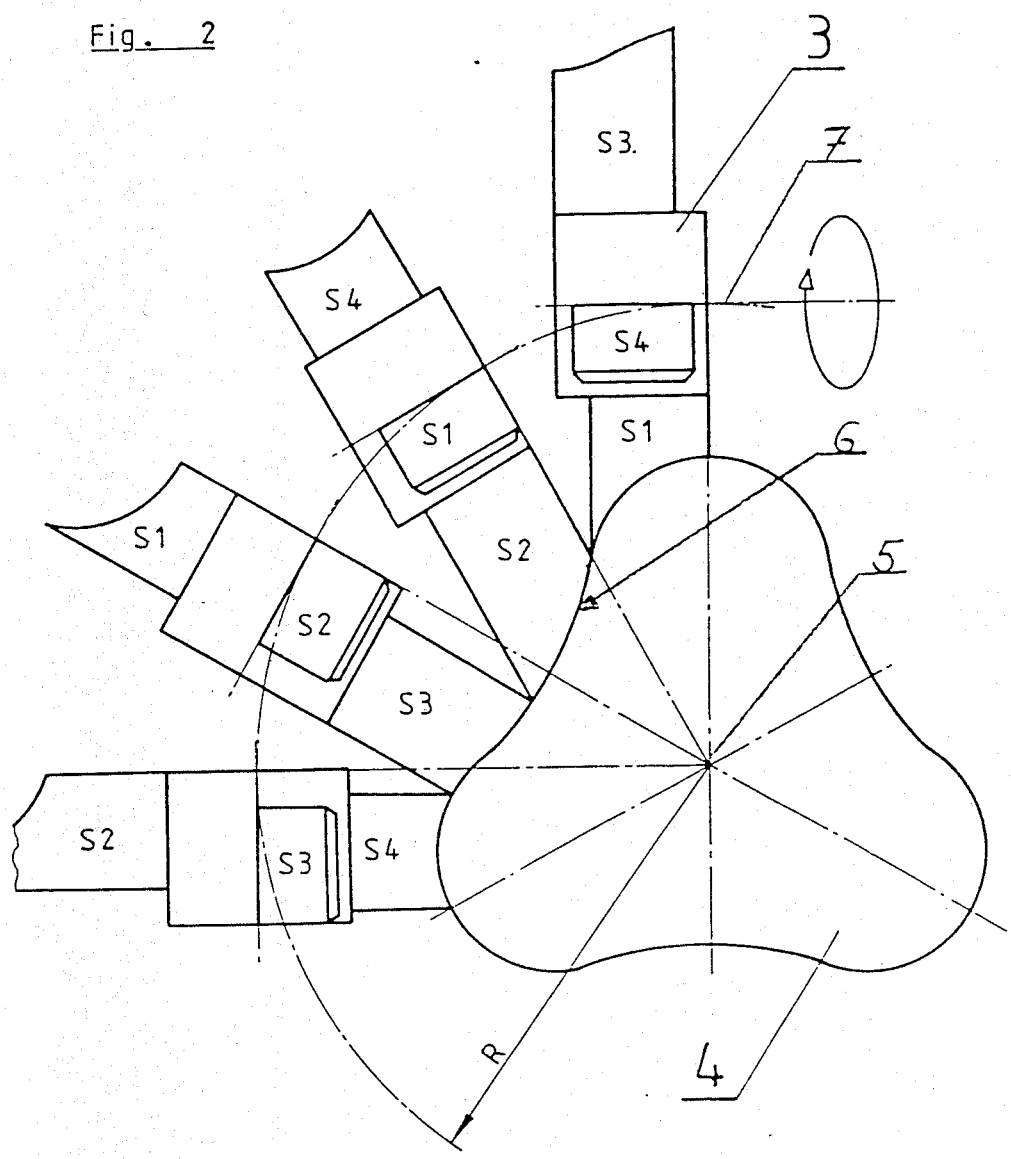

PROCESS AND APPARATUS FOR PROFILING ROD-LIKE WORKPIECES

FIELD OF THE INVENTION

The invention relates to a milling process for radially profiling rod-like workpieces, in particular Mohno pump rotors having one or more threads, with or without a pitch, and to an apparatus for performing the process.

BACKGROUND OF THE INVENTION

Different turning and milling processes are generally used for the profile machining of rod-like workpieces. During the turning process the cutting is generally carried out by a cutting edge. On account of its limited loading capacity only low productivity figures can be achieved. During profiling, diagonally arranged profiling cutters are used in accordance with the number of threads of the profile. In the case of multiple-threaded profiles, however, the possibilities of use for the machining of the complete profile which is carried out simultaneously is limited by considerations of space and by the complexity of the plant required. On the basis of the state of the art it can be seen that the formation of profiles is possible using rod-like workpieces only with time-consuming technological procedures, such as turning or milling.

SUMMARY OF THE INVENTION

The object of the present invention is to remedy these drawbacks and to improve a milling process for radially profiling rod-like workpieces. The process is particularly useful for Mohno pump rotors of the type described above in such a way that the machining of the complete profiles can be carried out with simple means in one operation with a high degree of productivity. An apparatus for performing this process is also provided.

This object is attained according to the invention in that individual cutting edges arranged on a milling head with different radial positions and profiles and successively moving into the profile plane of the workpiece produce the profile or its periodically repeated segmented flanks in accordance with the number of cutting edges. Said profiling process is effected during one rotational movement about the axis of the milling head by a superimposed relative rotatory motion about the workpiece axis.

The entire movement of the cutter head or milling head comprises three mutually coordinated components: a relative rotatory movement about the axis of the workpiece; a rotating movement about its own axis; and in addition a linear feed movement parallel to the workpiece axis. The relative rotatory movement about the workpiece axis can be produced by rotating the workpiece or by a planetary movement of the cutter head about the workpiece axis.

The cutting edges are arranged in specific angular position in the cutter head. The radial position and the profiling of the individual cutting edges is arranged to be such that with one revolution of the cutter head they produce the complete profile or its periodically repeated segmented flanks corresponding to the number of cutters. A plurality of profile planes parallel to one another and determined by segment can be produced by the linear feed movement, thereby permitting a three-dimensional formation of the profile.

The regularity of the profiles consisting of the profile segments is made possible by coordinating the individual movements. When the relative movement through 360° of the cutter head about the axis of the workpiece is superimposed on a complete revolution of the said cutter head about its own axis, the feed movement produces a profile whose edge lines run parallel to the longitudinal axis. If this relative movement is less than or greater than 360° relative to one revolution of the cutter head, profiles with inclinations are produced. In the case of profiles with a plurality of periodically repeated flanks the profiling produced by a revolution of the cutter head about its axis can preferably involve one flank. In this case a profile without a pitch can be produced if the relative planetary movement angle with respect to a flank corresponds approximately to the quotient 360°/flank number.

Since the cutting edge movement consists of three components acting in different directions, a deviation generally arises between the cutting edge profiles and the predetermined cutting contours sought. The deviations can be reduced in such a way that the axis of rotation of the cutter head lies in the plane of the maximum radius of curvature of the profile. The remaining profile defects can be reduced by compensating the cutting edge shapes.

It is particularly advantageous if the superimposed relative rotatory motion of the milling head about the axis of the workpiece is produced by rotating the workpiece.

According to a modification of the invention the superimposed relative rotatory motion of the milling head about the axis of the workpiece is produced by the rotatory motion of the milling head with a constant radius.

In particular, it is advantageous for there to be constant, continuous rotational speed ratios between the superimposed relative motion and the rotational movement of the milling head during operation.

The invention also relates to an apparatus for radially profiling rod-like workpieces, in particular Mohno pump rotors, with on or more threads, with or without a pitch. The apparatus is characterized by a milling head rotating about its own axis by cutting edges mounted on the milling head in specific sector angle intervals, and in different radial positions corresponding to the profile to be produced and with matching cutting edge profiles, by drive means for rotating the milling head about its axis, for the relative movement between the milling head and the workpiece about the longitudinal axis of the workpiece and for the relative axial movement between the milling head assembly and the workpiece, and by control means for the rotational speed ratios between the superimposed relative rotatory motion of the milling head about the workpiece and the rotational movement of the milling head about its axis.

According to one embodiment of the apparatus a common drive is provided for the rotational movements. The control means are constructed in the form of gear systems.

For the relative axial movement between the milling head assembly and the workpiece it is advantageous to provide a drive which moves the milling head assembly along the workpiece. When the milling head assembly is stationary a drive moves the workpiece through the milling head assembly.

According to an advantageous further development of the apparatus according to the invention, an electronic processor is provided as a control means for the drive means.

Sensors for determining the respective relative position between the milling head cutting edges, the milling head assembly and the workpiece are advantageously connected to the electronic processor.

DESCRIPTION OF THE DRAWINGS

Further details, features and advantages of the invention are explained below with reference to the drawings, in which:

FIG. 1 shows an arrangement according to the process with a rotating workpiece and eight cutting edges.

FIG. 2 shows an arrangement according to the process with a circulating cutter head and four cutting edges.

FIG. 3a is a side view; and FIG. 3b is a semi-sectional top view.

Figure 3A:
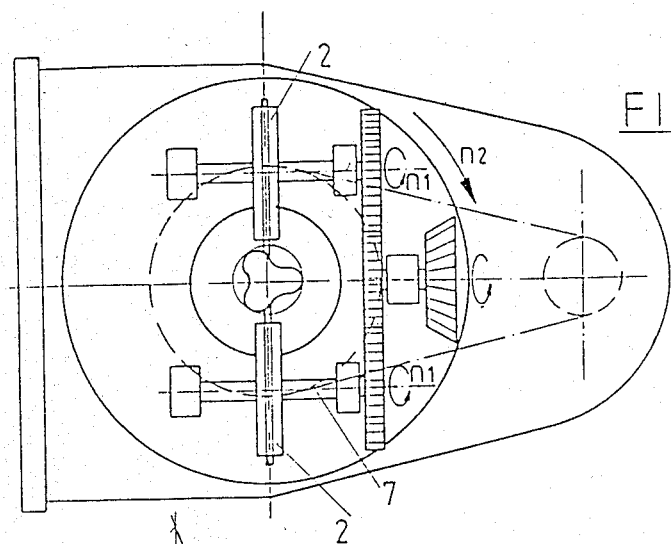
FIGS. 3a and 3b show an embodiment wherein a device can be retrofitted to a lathe.

The process for producing profiles on rod-like workpieces is diagrammatically illustrated in one embodiment in FIG. 1. The relative positions between the workpiece 1 and the cutter head 2 corresponding to the cutting segment positions produced are shown in a plan view and in a lateral view in the profile plane. The cutter head 2 is provided with eight cutting edges for example, which are indicated by the symbols (S1 ... S8). The relative circulating movement of the cutter head 2 about the longitudinal axis 5 of the workpiece is effected by rotating the workpiece 1. The individual cutting phases can be seen in the successive cutting positions.

Drives (not shown) are provided in order to produce the rotational movement and axial longitudinal movement respectively. These drives can comprise electric motors, hydraulic motors or the like. For example, a drive can be provided both for rotating the cutter head about its axis and for rotating the cutter head about the longitudinal axis of the workpiece, both these drives being connected to control means. Mechanical clutches can act as control means. An electronic control means (not shown) in the form of a processor can preferably be used as the control means, sensors (likewise not shown) being provided for determining the respective relative position between the milling head, the milling head cutting edges and the workpiece.

Another embodiment of the process according to the invention is illustrated in FIG. 2. A workpiece profile is produced with flanks 6 which are periodically repeated three times. The workpiece 4 is rigidly clamped. The circulating movement of the cutter head 3 about the longitudinal axis 5 at the radius (R) is coordinated with this rotational movement. The flank segment are profiled by for example four cutting edges (S1 ... S4). More than four cutting edges according to FIG. 2 or eight cutting edges according to FIG. 1 can also of course be used or arranged.

The drives (not shown) for the individual types of movement can also be constructed in the form of stepping motors. When the milling head is rotated abut the longitudinal axis of the workpiece the milling head is advantageously secured to a support (not shown) which embraces the workpiece. This support can be mounted rigidly when the workpiece is rotated about its longitudinal axis by means of a suitable drive, or if the workpiece is clamped the support is moved about the workpiece by the milling head, referred to as the milling head assembly. In a similar way the relative axial movement between the milling head assembly and the workpiece can be produced by movement of the milling head assembly relative to the workpiece or the workpiece is moved (pulled, pushed or the like) through the rigidly disposed milling head assembly.

Figure 3B:
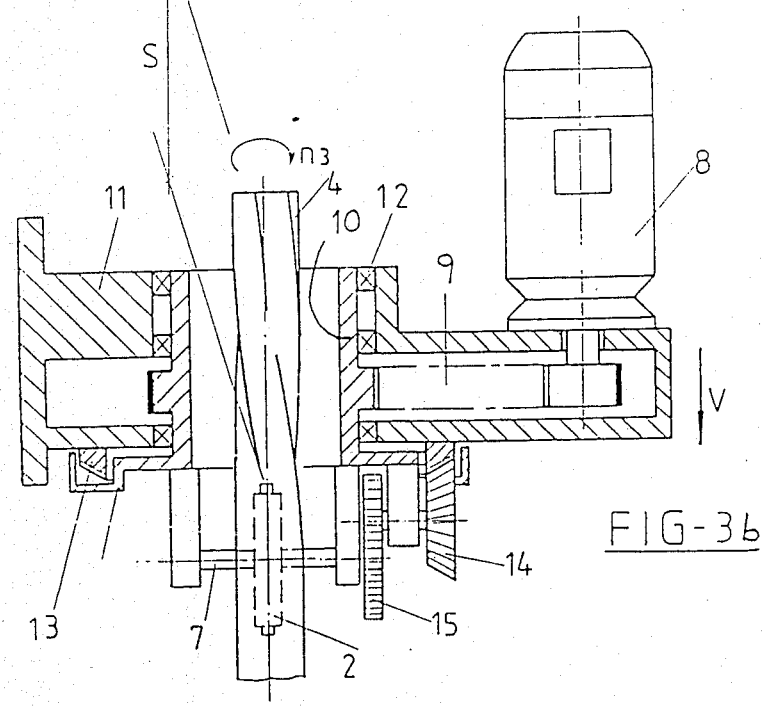

As shown in FIGS. 3a and 3b, work on a workpiece fastened to a lathe by conventional means is accomplished by means of two opposite cutter heads designated in accordance with the invention.

Rotation of the cutter heads in the direction of arrow n1, as well as their rotational movement in the direction of arrow n2 is accomplished by means of an electric motor 8. The motor 8 drives a rotor 10 via a toothed heel 9. The rotor 10 is annularly disposed to receive the cutter heads, and the rotating axis of which coincides with the longitudinal axis of the workpiece. The rotatable position of the rotor 10 in relation to the body of the device 11 is determined by bearings 12 suitable for radial and axial guidance.

A conical toothed rim 13, moving in a forward direction 2, is disposed on the body of the device 11 concentrically to the rotor 10 and fixedly fastened to the body of the device 11. The toothed rim 13 drives the cutter head axles 7 bearingly disposed on the rotor by toothed wheels 15 in such a way that a one-third turn of the rotor 10 results in a full turn of both cutter heads.

To create the desired pitch 5 of the section, the workpiece is turned at a lower rate n3, which depends on the forward progress V.

The invention is not restricted to the features and steps illustrated and described. It embraces all modifications, further developments and simplifications which could be made by a person skilled in the art.

The foregoing description of the specific embodiments will so fully reveal the general nature of the invention that other can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology employed herein is for the purpose of description and not of limitation.

What is claimed is:

1. A process for radially profiling rod-like workpieces having at least one thread, comprising:
   providing individual cutting edges arranged on a milling head with different radial positions and profiles and rotating said milling head about its axis;
   providing a relative rotary motion of said rod-like workpiece effectively about its longitudinal axis with respect to said milling head to successively move the workpiece into a profile plane to produce the profile in accordance with the number of cutting edges on the milling head;
   the profiling process being effected during one rotation about the axis of the milling head by superimposition therewith of said relative rotary motion about the axis of the workpiece.

2. The process of claim 1 wherein the axis of rotation of the milling head lies approximately in the normal plane of the profile cut.

3. The process of claim 1 wherein the superimposed rotatory motion of the milling head about the axis of the workpiece is produced by rotating the workpiece.

4. The process of claim 2 wherein the superimposed rotatory motion of the milling head about the axis of the workpiece is produced by rotating the workpiece.

5. The process of claim 1 wherein the superimposed rotatory motion of the milling head about the axis of the workpiece is produced by the rotatory motion of the milling head with a constant radius.

6. The process of claim 2 wherein the superimposed rotatory motion of the milling head about the axis of the workpiece is produced by the rotatory motion of the milling head with a constant radius.

7. The process of claim 1 wherein there are constant, continuous rotational speed ratios between the superimposed relative rotatory motion and the rotational movement of the milling head during operation.

8. An apparatus for radially profiling rod-like workpieces having at least one thread, comprising:
a milling head rotating about its own axis;
cutting edges mounted on the milling head in specific sector angle intervals in radial position corresponding to the profile to be produced and having matching cutting edge profiles;
drive means for rotating the milling head about its axis and for providing relative movement between the milling head and the workpiece about the longitudinal axis of the workpiece and for relative axial movement between the milling head assembly and the workpiece; and
control means for rotational speed ratios between the superimposed rotatory motion of the milling head about the workpiece and rotational movement of the milling head about its axis.

9. The apparatus of claim 8 wherein a common drive is provided for the rotational movements, and the control means are constructed in the form of gear systems.

10. The apparatus of claim 8 wherein a drive is provided for the relative axial movement, which drive moves the milling head assembly along the workpiece.

11. The apparatus of claim 8 wherein a drive is provided for the relative axial movement, which drive moves the workpiece through the milling head assembly when the milling head assembly is stationary.

12. The apparatus of claim 8 wherein an electronic processor is provided as a control for the drive means.

13. The apparatus of claim 10 wherein an electronic processor is provided as a control for the drive means.

14. The apparatus of claim 11 wherein an electronic processor is provided as a control for the drive means.

15. The apparatus of claim 12 wherein sensors are connected to the electronic processor for determining the respective relative position between the milling head cutting edges, the milling head assembly, and the workpiece.

* * * * *